United States Patent
Yasunori (10) Patent No.: US 11,066,027 B2
(45) Date of Patent: Jul. 20, 2021

(54) IN-VEHICLE POWER SUPPLY APPARATUS CONFIGURED TO CHARGE A PLURALITY OF BATTERIES

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventor: Hiromichi Yasunori, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 173 days.

(21) Appl. No.: 15/758,620

(22) PCT Filed: Aug. 24, 2016

(86) PCT No.: PCT/JP2016/074594
§ 371 (c)(1),
(2) Date: Mar. 8, 2018

(87) PCT Pub. No.: WO2017/043311
PCT Pub. Date: Mar. 16, 2017

(65) Prior Publication Data
US 2018/0208137 A1   Jul. 26, 2018

(30) Foreign Application Priority Data

Sep. 11, 2015   (JP) .............................. JP2015-179319

(51) Int. Cl.
*H02J 7/14*   (2006.01)
*B60R 16/033*   (2006.01)
(Continued)

(52) U.S. Cl.
CPC ......... *B60R 16/033* (2013.01); *H01M 10/441* (2013.01); *H01M 10/482* (2013.01);
(Continued)

(58) Field of Classification Search
CPC ..... B60R 16/033; H02J 7/1492; H02J 7/1423; H02J 1/08; H01M 10/441; H01M 10/482
(Continued)

(56) References Cited

U.S. PATENT DOCUMENTS 4,004,208 A * 1/1977 Tamminen .......... B60R 16/0235
320/104
4,540,929 A * 9/1985 Binkley ................ H02J 7/0054
320/104
(Continued)

FOREIGN PATENT DOCUMENTS

JP   H09-327133 A   12/1997
JP   2007-300693 A   11/2007
(Continued)

OTHER PUBLICATIONS

Search Report for PCT/JP2016/074594, dated Nov. 8, 2016.

*Primary Examiner* — John T Trischler
(74) *Attorney, Agent, or Firm* — Honigman LLP (57) ABSTRACT

An in-vehicle power supply apparatus includes a converter that outputs DC power. A first power storage device and a second power storage device are charged via the converter. A first switch selects on/off between the converter and the first power storage device. A second switch selects on/off between the converter and the second power storage device. A voltage monitoring circuit detects a DC voltage on the output side of the converter, at a point closer to the converter than are the first switch and the second switch.

6 Claims, 3 Drawing Sheets

(51) Int. Cl.
*H02J 1/08* (2006.01)
*H01M 10/44* (2006.01)
*H01M 10/48* (2006.01)
*H02J 7/34* (2006.01)

(52) U.S. Cl.
CPC .............. *H02J 1/08* (2013.01); *H02J 7/1423* (2013.01); *H02J 7/1492* (2013.01); *H01M 2220/20* (2013.01); *H02J 7/345* (2013.01)

(58) Field of Classification Search
USPC ........................................................ 320/107
See application file for complete search history.

(56) References Cited

U.S. PATENT DOCUMENTS

| | | | | |
|---|---|---|---|---|
| 5,169,735 | A * | 12/1992 | Witehira | B60R 16/03 180/270 |
| 5,355,071 | A * | 10/1994 | Ishida | H02J 7/1423 320/110 |
| 5,729,117 | A | 3/1998 | Fukuda | |
| 6,087,802 | A * | 7/2000 | James | B60L 53/14 320/104 |
| 6,133,710 | A * | 10/2000 | Okamura | H02J 7/0022 320/122 |
| 6,225,781 | B1 * | 5/2001 | Okamura | H02J 7/0016 320/122 |
| 6,377,029 | B1 * | 4/2002 | Krieger | H02J 7/0054 320/104 |
| 6,552,511 | B1 * | 4/2003 | Fayram | H02J 7/0013 320/103 |
| 6,734,651 | B2 * | 5/2004 | Cook | F02N 11/0866 320/103 |
| 6,781,806 | B2 * | 8/2004 | Hashimoto | G05F 1/575 361/91.1 |
| 7,049,789 | B2 * | 5/2006 | Taniguchi | H02J 7/1423 320/104 |
| 7,453,232 | B2 * | 11/2008 | Furukawa | H02J 7/0021 320/104 |
| 7,477,038 | B2 * | 1/2009 | Taniguchi | H02J 7/1423 320/104 |
| 7,506,182 | B2 * | 3/2009 | Taniguchi | B60L 7/10 307/10.6 |
| 7,719,284 | B2 * | 5/2010 | Ohta | H02J 7/0021 324/434 |
| 7,750,505 | B2 * | 7/2010 | Ichikawa | B60L 58/20 307/82 |
| 7,859,227 | B2 * | 12/2010 | Saigo | H01M 10/441 320/118 |
| 7,872,443 | B2 * | 1/2011 | Ward | H02J 7/35 320/103 |
| 8,004,237 | B2 * | 8/2011 | Manor | H02J 7/0054 307/45 |
| 8,030,882 | B2 * | 10/2011 | Ito | B60L 15/007 320/104 |
| 8,144,024 | B2 * | 3/2012 | Akimov | G01R 31/025 340/636.1 |
| 8,319,650 | B2 * | 11/2012 | Volodymyr | G01R 31/025 340/636.1 |
| 8,441,228 | B2 * | 5/2013 | Brabec | B60L 11/1809 320/104 |
| 8,442,727 | B2 * | 5/2013 | Yamamoto | B60L 58/20 701/49 |
| 8,541,905 | B2 * | 9/2013 | Brabec | B60L 11/1809 307/10.7 |
| 8,558,506 | B2 * | 10/2013 | Lee | H02J 7/0013 320/114 |
| 8,598,734 | B2 * | 12/2013 | Kusumi | H02M 3/1584 307/10.1 |
| 8,723,457 | B2 * | 5/2014 | Komatsu | B60L 58/20 318/139 |
| 9,048,669 | B2 * | 6/2015 | Lim | H02J 7/0019 |
| 9,102,241 | B2 * | 8/2015 | Brabec | B60L 58/12 |
| 9,136,783 | B2 * | 9/2015 | Mitsutani | B60L 15/00 |
| 9,166,515 | B2 * | 10/2015 | Kaita | B60L 15/2009 |
| 9,199,543 | B2 * | 12/2015 | Brabec | B60L 53/00 |
| 9,221,354 | B2 * | 12/2015 | Hatanaka | B60L 7/14 |
| 9,300,148 | B2 * | 3/2016 | Oh | B60L 53/22 |
| 9,441,600 | B2 * | 9/2016 | Klinkig | B60R 16/03 |
| 9,496,735 | B2 * | 11/2016 | Sarkar | H01M 16/00 |
| 9,499,053 | B2 * | 11/2016 | Imamura | B60L 58/21 |
| 9,537,333 | B2 * | 1/2017 | Smith | H02J 7/0031 |
| 9,694,697 | B2 * | 7/2017 | Brabec | H02J 7/0019 |
| 9,711,979 | B2 * | 7/2017 | Takemura | H01M 10/425 |
| 9,731,616 | B2 * | 8/2017 | Hatanaka | B61C 3/02 |
| 9,871,388 | B2 * | 1/2018 | Nakamura | H02J 7/0013 |
| 9,873,339 | B2 * | 1/2018 | Mitsutani | B60L 58/20 |
| 9,882,403 | B2 * | 1/2018 | Lu | H02J 7/0029 |
| 9,931,951 | B2 * | 4/2018 | Khaligh | B60L 53/22 |
| 9,944,188 | B2 * | 4/2018 | Reichow | B60L 50/10 |
| 10,101,799 | B2 * | 10/2018 | Huang | G06F 1/3206 |
| 10,161,992 | B2 * | 12/2018 | Kawamura | G01R 31/2829 |
| 10,279,761 | B2 * | 5/2019 | Taniguchi | B60R 16/033 |
| 10,320,034 | B2 * | 6/2019 | Hallmark | H01M 10/425 |
| 10,404,095 | B2 * | 9/2019 | Sakamoto | H02J 9/061 |
| 10,407,005 | B2 * | 9/2019 | Aoki | H02J 7/0052 |
| 10,439,496 | B2 * | 10/2019 | Katrak | H02M 1/32 |
| 10,696,182 | B2 * | 6/2020 | Khaligh | H01F 3/14 |
| 10,855,193 | B2 * | 12/2020 | Maruyama | H02M 7/66 |
| 2003/0086226 | A1 | 5/2003 | Hashimoto et al. | |
| 2005/0062455 | A1 * | 3/2005 | Stavely | G06F 1/263 320/106 |
| 2005/0093508 | A1 | 5/2005 | Taniguchi et al. | |
| 2006/0006840 | A1 * | 1/2006 | Furukawa | H02J 7/0021 320/116 |
| 2006/0038532 | A1 * | 2/2006 | Taniguchi | H02J 7/1423 320/103 |
| 2006/0041765 | A1 * | 2/2006 | Taniguchi | B60L 7/10 713/320 |
| 2006/0132139 | A1 * | 6/2006 | Ohta | H02J 7/0021 324/426 |
| 2007/0032915 | A1 * | 2/2007 | Yamaguchi | H02J 7/1423 701/1 |
| 2008/0036424 | A1 * | 2/2008 | Saigo | H01M 10/441 320/136 |
| 2008/0197801 | A1 * | 8/2008 | Manor | H02J 7/0054 320/103 |
| 2008/0203966 | A1 * | 8/2008 | Ward | H02J 7/35 320/104 |
| 2008/0316774 | A1 * | 12/2008 | Ito | B60L 53/22 363/17 |
| 2009/0001926 | A1 * | 1/2009 | Sato | B60L 3/0046 320/102 |
| 2009/0058329 | A1 * | 3/2009 | Ichikawa | B60L 58/20 318/139 |
| 2009/0107743 | A1 * | 4/2009 | Alston | H02J 7/1423 180/65.21 |
| 2009/0278488 | A1 * | 11/2009 | Choi | H02J 7/0016 320/103 |
| 2011/0025124 | A1 * | 2/2011 | Brabec | H02M 3/1584 307/9.1 |
| 2011/0025125 | A1 * | 2/2011 | Brabec | H02J 7/1423 307/9.1 |
| 2011/0025126 | A1 * | 2/2011 | Brabec | B60L 58/12 307/9.1 |
| 2011/0127830 | A1 * | 6/2011 | Harding | B60R 16/033 307/10.7 |
| 2011/0140661 | A1 * | 6/2011 | Lee | H02J 7/0045 320/114 |
| 2011/0199223 | A1 * | 8/2011 | Akimov | G01R 31/025 340/636.1 |
| 2011/0273136 | A1 * | 11/2011 | Yoshimoto | H02M 1/10 320/103 |
| 2011/0298414 | A1 * | 12/2011 | Manor | H02J 7/0054 320/103 |
| 2012/0032505 | A1 * | 2/2012 | Kusumi | B60L 58/22 307/10.1 |
| 2012/0049771 | A1 * | 3/2012 | Komatsu | B60L 58/20 318/139 |

(56) References Cited

U.S. PATENT DOCUMENTS

| | | | | |
|---|---|---|---|---|
| 2012/0049794 A1* | 3/2012 | Han | B60L 53/14 | 320/109 |
| 2012/0086390 A1* | 4/2012 | Lim | H02J 7/0019 | 320/107 |
| 2012/0091930 A1* | 4/2012 | Takahashi | H02J 7/0013 | 318/139 |
| 2012/0112684 A1* | 5/2012 | Xu | B60L 3/0046 | 320/101 |
| 2012/0143425 A1* | 6/2012 | Yamamoto | B60L 58/20 | 701/22 |
| 2012/0146651 A1* | 6/2012 | Volodymyr | G01R 31/025 | 324/430 |
| 2012/0235626 A1* | 9/2012 | Oh | H02M 3/33592 | 320/103 |
| 2012/0248869 A1* | 10/2012 | Itagaki | H02J 7/1423 | 307/9.1 |
| 2012/0296506 A1* | 11/2012 | Kotani | H02J 1/00 | 701/22 |
| 2013/0119932 A1* | 5/2013 | Moon | H02J 7/0013 | 320/109 |
| 2013/0221897 A1* | 8/2013 | Brabec | B60L 11/1809 | 320/104 |
| 2013/0229153 A1* | 9/2013 | Sarkar | B60L 50/52 | 320/130 |
| 2013/0264975 A1* | 10/2013 | Kaita | B60L 15/2009 | 318/139 |
| 2013/0334878 A1* | 12/2013 | Brabec | H02J 7/0073 | 307/9.1 |
| 2014/0077771 A1* | 3/2014 | Yamashita | B60K 6/28 | 320/167 |
| 2014/0111120 A1* | 4/2014 | Mitsutani | B60L 15/00 | 318/139 |
| 2014/0111122 A1* | 4/2014 | Kawashima | H02J 7/0029 | 318/139 |
| 2014/0145506 A1* | 5/2014 | Lu | H02J 7/0029 | 307/66 |
| 2014/0306519 A1* | 10/2014 | Song | B60L 11/1809 | 307/9.1 |
| 2014/0354212 A1* | 12/2014 | Sugeno | B60L 58/22 | 320/103 |
| 2015/0035356 A1* | 2/2015 | Sakata | H02J 7/16 | 307/9.1 |
| 2015/0084345 A1* | 3/2015 | Klinkig | B60R 16/03 | 290/38 E |
| 2015/0183325 A1* | 7/2015 | Mitsutani | B60L 58/20 | 307/10.1 |
| 2015/0183329 A1* | 7/2015 | Nakaya | H02J 3/383 | 307/9.1 |
| 2015/0256001 A1* | 9/2015 | Nakamura | H02J 7/0013 | 320/112 |
| 2015/0291039 A1* | 10/2015 | Sakata | B60L 50/10 | 307/10.1 |
| 2015/0291052 A1* | 10/2015 | Nakazawa | B60L 8/003 | 320/101 |
| 2015/0314685 A1* | 11/2015 | Imamura | B60L 58/21 | 318/504 |
| 2016/0016479 A1* | 1/2016 | Khaligh | H01F 3/14 | 363/17 |
| 2016/0016483 A1* | 1/2016 | Yasunori | H01M 10/44 | 320/162 |
| 2016/0185230 A1* | 6/2016 | Reichow | B60L 50/10 | 307/10.1 |
| 2017/0012445 A1* | 1/2017 | Takemura | H01M 10/425 | |
| 2017/0088071 A1* | 3/2017 | Min | B60R 16/033 | |
| 2017/0141591 A1* | 5/2017 | Chen | H02J 7/0026 | |
| 2017/0179758 A1* | 6/2017 | Kruiskamp | H02J 3/14 | |
| 2017/0285109 A1* | 10/2017 | Kawamura | H02J 7/0008 | |
| 2017/0285728 A1* | 10/2017 | Huang | G06F 1/3206 | |
| 2017/0292990 A1* | 10/2017 | Kawamura | G01R 31/2829 | |
| 2017/0366019 A1* | 12/2017 | Sung | H02J 7/0016 | |
| 2017/0373519 A1* | 12/2017 | Lei | H02J 7/0054 | |
| 2018/0015891 A1* | 1/2018 | Taniguchi | B60R 16/033 | |
| 2018/0015892 A1* | 1/2018 | Aoki | B60R 16/033 | |
| 2018/0026316 A1* | 1/2018 | Teng | H02J 7/0029 | 320/134 |
| 2018/0062520 A1* | 3/2018 | Katrak | H02M 1/32 | |
| 2018/0222333 A1* | 8/2018 | Khaligh | H01F 38/08 | |
| 2018/0241225 A1* | 8/2018 | Shirai | B60L 58/12 | |
| 2018/0358832 A1* | 12/2018 | Son | B60L 8/003 | |
| 2019/0115632 A1* | 4/2019 | Beuning | H01M 10/443 | |
| 2019/0143822 A1* | 5/2019 | Malek | H02J 7/02 | 320/109 |
| 2019/0148973 A1* | 5/2019 | Kim | B60L 53/22 | 320/109 |
| 2019/0356157 A1* | 11/2019 | Ohashi | H02J 7/0029 | |
| 2020/0212815 A1* | 7/2020 | Yamasaki | H02J 7/007 | |
| 2020/0366106 A1* | 11/2020 | Nguyen | B60L 53/67 | |

FOREIGN PATENT DOCUMENTS

| | | |
|---|---|---|
| JP | 2008-037239 A | 2/2008 |
| JP | 2014-151873 A | 8/2014 |
| WO | WO-2009089160 A3 * 10/2009 | ......... B60R 16/0236 |

* cited by examiner

IN-VEHICLE POWER SUPPLY APPARATUS CONFIGURED TO CHARGE A PLURALITY OF BATTERIES

This application is the U.S. national stage of PCT/JP2016/074594 filed Aug. 24, 2016, which claims priority of Japanese Patent Application No. JP 2015-179319 filed Sep. 11, 2015.

TECHNICAL FIELD

This invention relates to an in-vehicle power supply apparatus.

BACKGROUND

JP 2015-83404A describes an in-vehicle power supply apparatus that has a main battery and a sub-battery. The main battery and the sub-battery are charged by an alternator.

Providing a plurality of sub-batteries is neither described nor suggested in JP 2015-83404A, and has not been taken into consideration. In the case where a plurality of batteries are provided, it is desirable to charge the batteries with respectively suitable voltages, and low manufacturing cost is also desirable.

In view of this, an object of the instant invention is to provide an in-vehicle power supply apparatus that is capable of charging a plurality of power storage devices with respectively suitable voltages, and that is able to reduce manufacturing cost.

SUMMARY

An in-vehicle power supply apparatus is provided with a DC-DC converter that outputs DC power, a first power storage device and a second power storage device that are charged via the DC-DC converter, a first switch that selects on/off between the DC-DC converter and the first power storage device, a second switch that selects on/off between the DC-DC converter and the second power storage device, and a voltage monitoring unit that detects a DC voltage on an output side of the DC-DC converter, at a point closer to the DC-DC converter than are the first switch and the second switch.

Advantageous Effects of Invention

Charging a plurality of power storage devices with respectively suitable voltages is possible, and manufacturing cost can be reduced.

DETAILED DESCRIPTION OF PREFERRED EMBODIMENTS

Configuration of in-Vehicle Power Supply Apparatus

Figure 1:
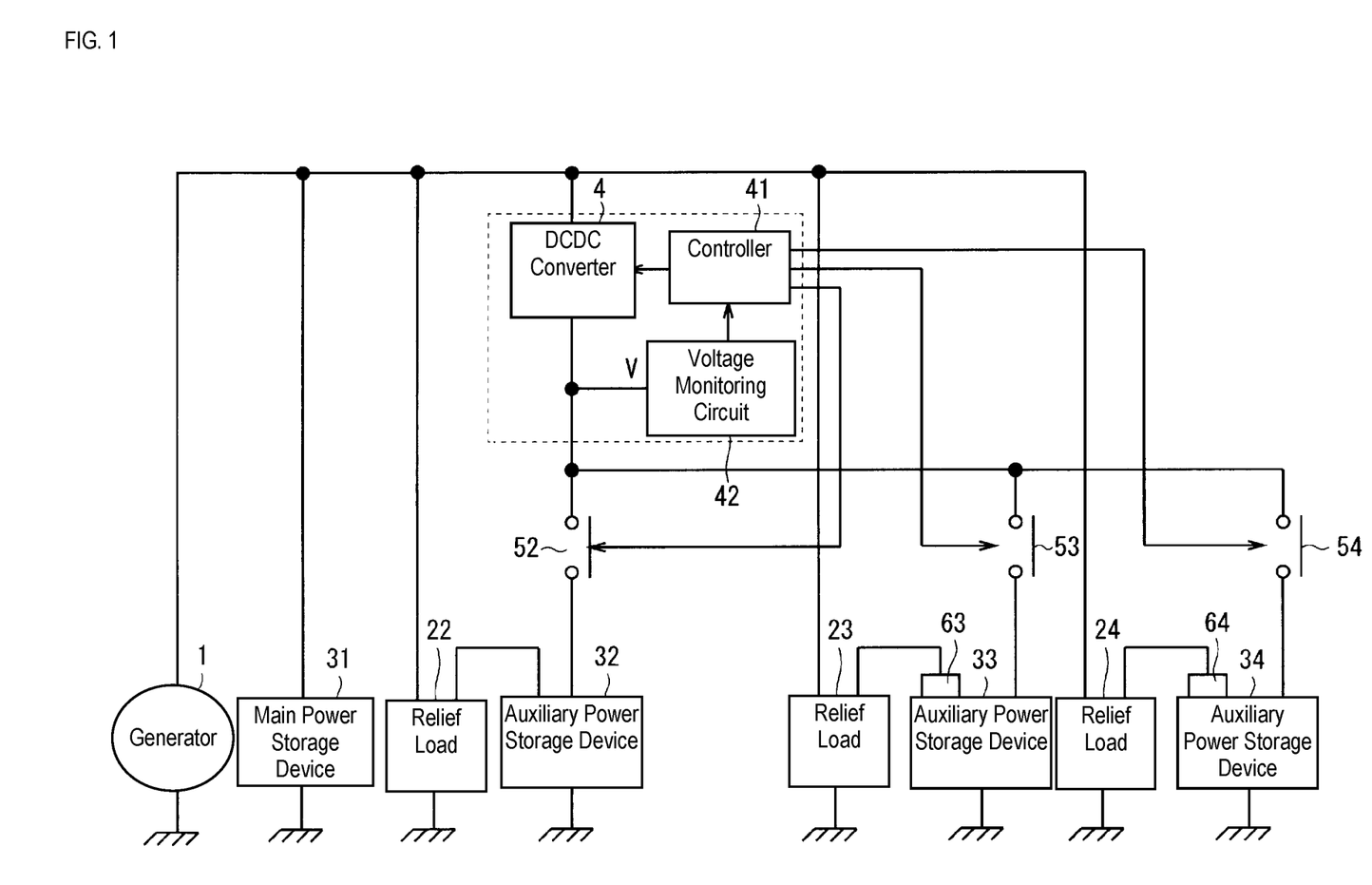
FIG. 1 is a diagram schematically showing an example of the configuration of an in-vehicle power supply apparatus.

FIG. 1 is a diagram schematically showing an example of the configuration of an in-vehicle power supply apparatus that is mounted in a vehicle. In the illustrative example of FIG. 1, a generator 1 is provided. The generator 1 is an alternator, for example, and generates power based on a driving force for driving the vehicle and outputs a direct current (DC) voltage.

In the illustrative example of FIG. 1, a main power storage device 31 is connected to the generator 1. The power storage device 31 is charged by the generator 1. A lead storage cell, for example, is employed as the main power storage device 31.

Also, a plurality of auxiliary power storage devices 32 to 34 are connected to the generator 1 via a converter 4 (denoted as "DCDC Converter" in FIG. 1). A lithium ion cell, a nickel hydride cell or a capacitor can be employed as the auxiliary power storage devices 32 to 34. Here, the auxiliary power storage device 32 is a lithium ion cell and the auxiliary power storage devices 33 and 34 are capacitors, for example. The characteristics of the auxiliary power storage devices 32 to 34 may differ from each other. For example, the rated voltage of the auxiliary power storage device 32 is higher than the rated voltage of the auxiliary power storage device 33, and the rated voltage of the auxiliary power storage device 33 is higher than the rated voltage of the auxiliary power storage device 34. For example, the auxiliary power storage device 32 is charged to 12 V to become fully charged, the auxiliary power storage device 33 is charged to 7 V to become fully charged, and the auxiliary power storage device 34 is charged to 5 V to become fully charged. Generally, the voltage when fully charged increases, the larger the rated voltage of the power storage device.

In the illustrative example of FIG. 1, a switch (e.g., relay) 52 is connected between the converter 4 and the auxiliary power storage device 32. The switch 52 selects on/off between the converter 4 and the auxiliary power storage device 32. Similarly, a switch (e.g., relay) 53 is connected between the converter 4 and the auxiliary power storage device 33, and a switch (e.g., relay) 54 is connected between the converter 4 and the auxiliary power storage device 34. For example, the switches 52 to 54 are connected in common to the output end of the converter 4 at one end, and the switches 52 to 54 are respectively connected to the auxiliary power storage devices 32 to 34 at the other end. On/off of the switches 52 to 54 is controlled by a controller 41.

The converter 4 is a DC-DC converter, for example, and is, as a more specific example, an H-bridge buck-boost converter circuit. The converter 4 is controlled by the controller 41, and boosts or bucks the DC voltage supplied from the generator 1 or the main power storage device 31 and outputs the resultant voltage. The converter 4 controls charging of the auxiliary power storage devices 32 to 34, as will be described in detail later. The auxiliary power storage devices 32 to 34 are charged with mutually different voltages or different currents, for example.

Note that, here, the controller 41 is configured to include a microcomputer and a storage device. The microcomputer executes processing steps (in other words, procedures) described in computer programs. The storage device can, for example, be constituted by one or a plurality of types of storage devices such as a ROM (Read Only Memory), a RAM (Random Access Memory), a rewritable nonvolatile memory (EPROM (Erasable Programmable ROM), etc.) and a hard disk drive. The storage device stores various types of information, data and the like, stores programs that are to be executed by the microcomputer, and provides a work area for executing the programs. Note that it is comprehensible that the microcomputer functions as various means corresponding to the processing steps described in the programs, or realizes various functions corresponding to the processing steps. Also, the controller 41 is not limited thereto, and the various procedures that are executed by the controller 41 or the various means or various functions that are realized thereby may be partly or entirely realized with hardware.

The controller 41 outputs a control signal to the converter 4 to control the output voltage or the output current of the converter 4. The controller 41 also outputs a control signal to the switches 52 to 54 to control on/off of the switches 52 to 54.

A DC voltage V on the output side (switches 52 to 54 side) of the converter 4 is monitored by a voltage monitoring circuit 42. This voltage monitoring circuit 42 detects the DC voltage V, at a point closer to the converter 4 than are the switches 52 to 54. For example, when the switch 52 is turned on and the switches 53 and 54 are turned off, the output end of the converter 4 is connected to the auxiliary power storage device 32. If the converter 4 has stopped operating at this time, this DC voltage V substantially matches the charging voltage of the auxiliary power storage device 32. That is, at this time, the voltage monitoring circuit 42 is able to detect the charging voltage of the auxiliary power storage device 32. Similarly, when the switch 53 is turned on, the switches 52 and 54 are turned off and operation of the converter 4 is stopped, the voltage monitoring circuit 42 is able to detect the charging voltage of the auxiliary power storage device 33, and when the switch 54 is turned on, the switches 52 and 53 are turned off and operation of the converter 4 is stopped, the voltage monitoring circuit 42 is able to detect the charging voltage of the auxiliary power storage device 34.

The voltage monitoring circuit 42 judges whether charging of the auxiliary power storage devices 32 to 34 needs to be started, based on the respective charging voltages thereof. For example, a charging rate may be calculated based on the detected charging voltage, and it may be judged whether the charging rate is larger than a charging reference value. More specifically, when it is judged that the charging rate is smaller than the charging reference value, it may be judged that charging needs to be started. Alternatively, when the detected charging voltage is smaller than a predetermined reference value, it may be judged that charging needs to be started. The voltage monitoring circuit 42, having judged that charging needs to be started, notifies the controller 41. Note that the voltage monitoring circuit 42 may be constituted by software, or may be constituted partly or entirely by hardware. Also, the judgment of whether to start charging may be performed by the controller 41. In this case, the controller 41 functions as part of the voltage monitoring circuit.

As mentioned above, according to this in-vehicle power supply apparatus, one voltage monitoring circuit 42 is able to monitor the charging voltages of the auxiliary power storage devices 32 to 34, by exclusively turning on the switches 52 to 54 in a state where operation of the converter 4 has been stopped. Therefore, manufacturing cost can be reduced, compared with the case where a voltage monitoring circuit is provided for each of the auxiliary power storage devices 32 to 34.

Also, the converter 4 is able to output voltages separately to the plurality of auxiliary power storage devices 32 to 34 or to output voltages in parallel. Therefore, manufacturing cost can be reduced, compared with the case where a converter is provided for each of the auxiliary power storage devices 32 to 34.

Also, the power storage devices can be easily expanded, by connecting a relay and a power storage device to the converter 4.

The power storage device 31 supplies power to the relief loads 22 to 24, and the auxiliary power storage devices 32 to 34 also respectively supply power to the relief loads 22 to 24. The relief loads 22 to 24 are loads to which power supply is desirably maintained (loads to be relieved from power shortage caused by the loss of power supply) even if power supply from the main power storage device 31 is lost (including loss of power supply due to malfunction of the main power storage device 31), and, for example, a by-wire electronic device (e.g., shift lever), a by-wire actuator (e.g., steering, brake), a parking brake or an electronic brake force distribution system can be given as examples thereof.

In the illustrative example of FIG. 1, the main power storage device 31 is connected to the relief loads 22 to 24 without passing via the converter 4, and power is supplied to the relief loads without buck-boost control. Also, in the illustrative example of FIG. 1, the auxiliary power storage device 32 is connected to the relief load 22 without passing via a boost converter circuit, and the auxiliary power storage devices 33 and 34 are respectively connected to the relief loads 23 and 24 via boost converter circuits 63 and 64. The boost converter circuit 63 boosts the voltage of the auxiliary power storage device 33 and outputs the boosted voltage to the relief load 23. The boost converter circuit 64 boosts the voltage of the auxiliary power storage device 34 and outputs the boosted voltage to the relief load 24.

Because the auxiliary power storage devices 32 to 34 are capable of respectively supplying power to the relief loads 22 to 24, power supply is maintained to the relief loads 22 to 24, even if power supply of the main power storage device 31 is lost. The auxiliary power storage devices 32 to 34 are therefore able to function as so-called backup power storage devices.

Also, as a result of the auxiliary power storage devices 32 to 34 being provided, the influence of a voltage drop in the main power storage device 31 can be suppressed or avoided, as will be described next. For example, as a result of the main power storage device 31 outputting a large current, an appropriate voltage can be respectively applied to the relief loads 22 to 24 by the auxiliary power storage devices 32 to 34, even if a voltage drop occurs in the main power storage device 31.

Charging Operation 1

Figure 2:
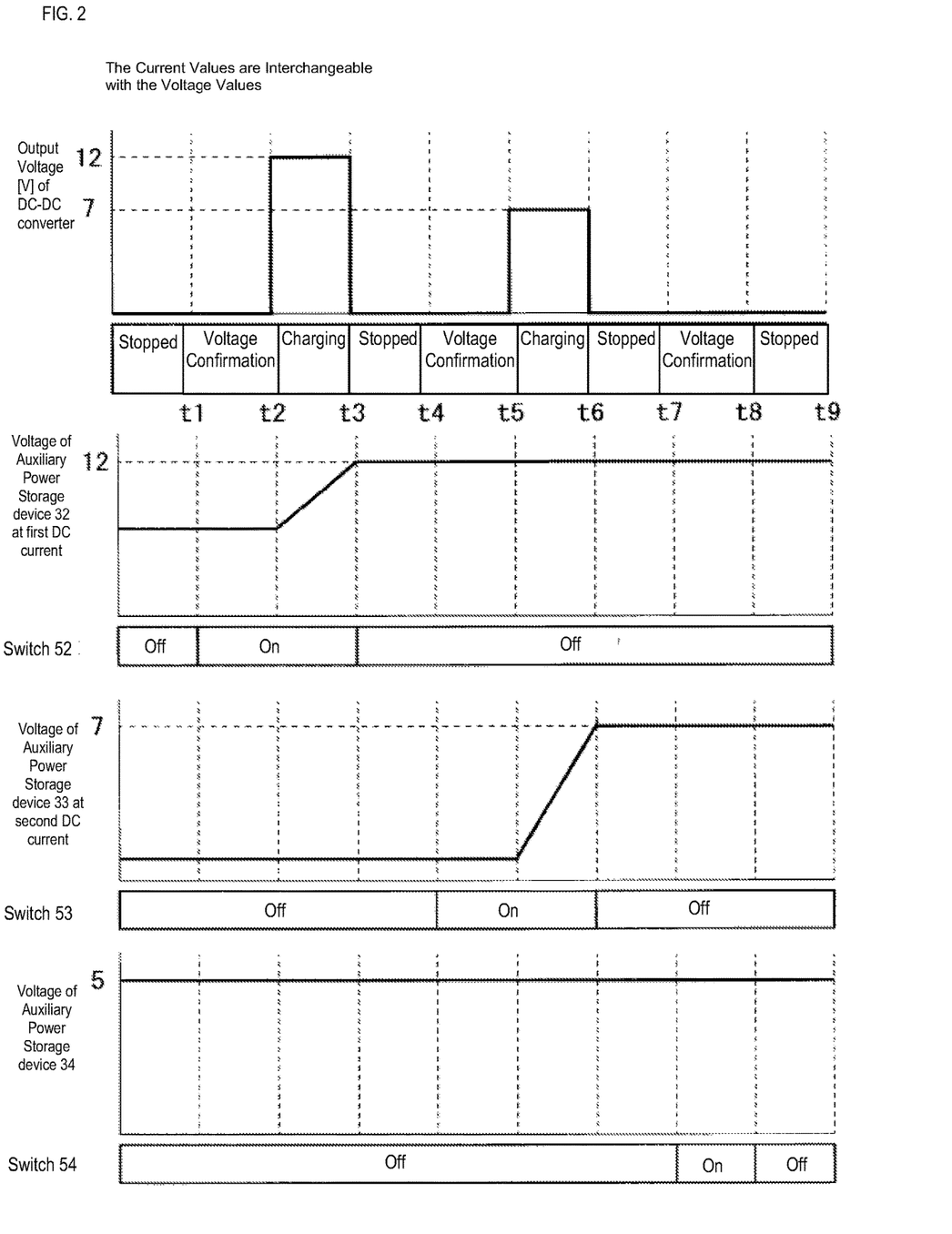
FIG. 2 is a diagram illustrating an example of a charging operation.

FIG. 2 is a diagram for illustrating an example of the charging operation. The output voltage that is output by the converter 4 and the charging voltages of the auxiliary power storage devices 32 to 34 are shown in the illustrative example of FIG. 2. The on/off state of the switches 52 to 54 is also shown.

In the illustrative example of FIG. 2, initially, the converter 4 is not operating and the switches 52 to 54 are off. At time t1, the controller 41 turns on the switch 52. The DC voltage V (not shown) on the output side of the converter 4 thereby substantially matches the charging voltage of the auxiliary power storage device 32. The voltage monitoring circuit 42 then judges whether charging of the auxiliary power storage device 32 needs to be started, based on this DC voltage V. Here, the voltage monitoring circuit 42 notifies the controller 41 that charging needs to be started.

The controller 41 receives this notification and, at time t2, causes the converter 4 to output DC power at a voltage or a current suitable for the auxiliary power storage device 32. For example, the controller 41 causes the converter 4 to output a voltage suitable for the auxiliary power storage device 32, such as a voltage of 12 V, for example. The auxiliary power storage device 32 is thereby charged, and the charging voltage increases over time.

When the charging rate of the auxiliary power storage device 32 then reaches a full charge reference value, the controller 41, at time t3, stops the operation of the converter 4 and turns off the switch 52. Note that the charging rate having reached the full charge reference value may, for example, be judged by the current that flows to the auxiliary power storage device 32 having decreased to less than or equal to a reference value. This current can be detected by providing a current detection unit on the output side of the converter 4, for example. Alternatively, it may be judged that the charging rate has reached the full charge reference value, as a result of a predetermined period having elapsed from the start of charging. In the illustrative example of FIG. 2, the charging voltage of the auxiliary power storage device 32 is 12 V at time t3.

At time t4 after time t3, the controller 41 turns on the switch 53. The DC voltage V on the output side of the converter 4 thereby substantially matches the charging voltage of the auxiliary power storage device 33. At this time, the voltage monitoring circuit 42 judges whether charging of the auxiliary power storage device 33 needs to be started, based on this DC voltage V. Here, the voltage monitoring circuit 42 notifies the controller 41 that charging is necessary.

The controller 41 receives this notification and, at time t5, causes the converter 4 to output DC power at a voltage or a current suitable for the auxiliary power storage device 33. For example, the controller 41 causes the converter 4 to output a voltage suitable for the auxiliary power storage device 33, such as a voltage of 7 V, for example. The auxiliary power storage device 33 is thereby charged, and the charging voltage increases over time.

When the charging rate of the auxiliary power storage device 33 then reaches the full charge reference value, the controller 41, at time t6, stops the operation of the converter 4, and turns off the switch 53. Charging of the auxiliary power storage device 33 is thereby completed. In the illustrative example of FIG. 2, the charging voltage of the auxiliary power storage device 33 at time t6 will be 7 V.

At time t7 after time t6, the controller 41 turns on the switch 54. The DC voltage V on the output side of the converter 4 thereby substantially matches the charging voltage of the auxiliary power storage device 34. At this time, the voltage monitoring circuit 42 judges whether charging of the auxiliary power storage device 34 needs to be started, based on this DC voltage V. In the illustrative example of FIG. 2, the charging voltage of the auxiliary power storage device 34 is 5 V, and thus the voltage monitoring circuit 42 notifies the controller 41 that charging is not necessary.

The controller 41 receives this notification and turns off the switch 54 at time t8.

According to the above-mentioned charging operation, the auxiliary power storage devices that require charging are charged at mutually different timings. Accordingly, the converter 4 is able to output DC power to the auxiliary power storage devices at voltages or currents suitable for the respective auxiliary power storage devices at respective timings. For example, the converter 4 is able to output a voltage of 12 V to charge the auxiliary power storage device 32, is able to output a voltage of 7 V to charge the auxiliary power storage device 33, and is able to output a voltage of 5 V to charge the auxiliary power storage device 34.

Quick charging becomes possible by charging with a larger voltage, the higher the rated voltage of the auxiliary power storage device. Of course, it is desirable to set the voltage that is output from the converter 4 appropriately in order to avoid overvoltage charging. For example, the voltage that the converter 4 outputs to the auxiliary power storage devices 32 and 33 will be the respective rated voltages of the auxiliary power storage devices 32 and 33.

Note that even though the output voltage of the converter 4 is controlled in the abovementioned example, the output current may be controlled. For example, the case where the rated current of the auxiliary power storage device 33 is lower than the rated current of the auxiliary power storage device 32 will be considered. Generally, charging can be performed with a larger current, the higher the rated current of the power storage device.

When it is judged that charging of the auxiliary power storage device 32 needs to be started, the controller 41 causes the converter 4 to output DC power at a first DC current, in a state where only the switch 52 is turned on among the switches 52 to 54. The auxiliary power storage device 32 is thereby charged. On the other hand, when it is judged that charging of the auxiliary power storage device 33 needs to be started, the controller 41 causes the converter 4 to output DC power at a second DC current that is smaller than the first DC current, in a state where only the switch 53 is turned on among the switches 52 to 54. The auxiliary power storage device 33 is thereby charged.

Quick charging becomes possible by charging with a larger current, the higher the rated current of the auxiliary power storage device. Of course, it is desirable to set the current that is output from the converter 4 appropriately in order to avoid overcurrent charging. For example, the current that the converter 4 outputs to the auxiliary power storage devices 32 and 33 may be set to one tenth of the respective rated currents of the auxiliary power storage devices 32 and 33.

Also, the converter 4 may control both the output voltage and the output current. For example, the converter 4 may be caused to output DC power at a constant current during initial charging, and after the charging voltage has reached the rated voltage, the converter 4 may be caused to output DC power at a constant voltage.

Charging Operation 2

Figure 3:
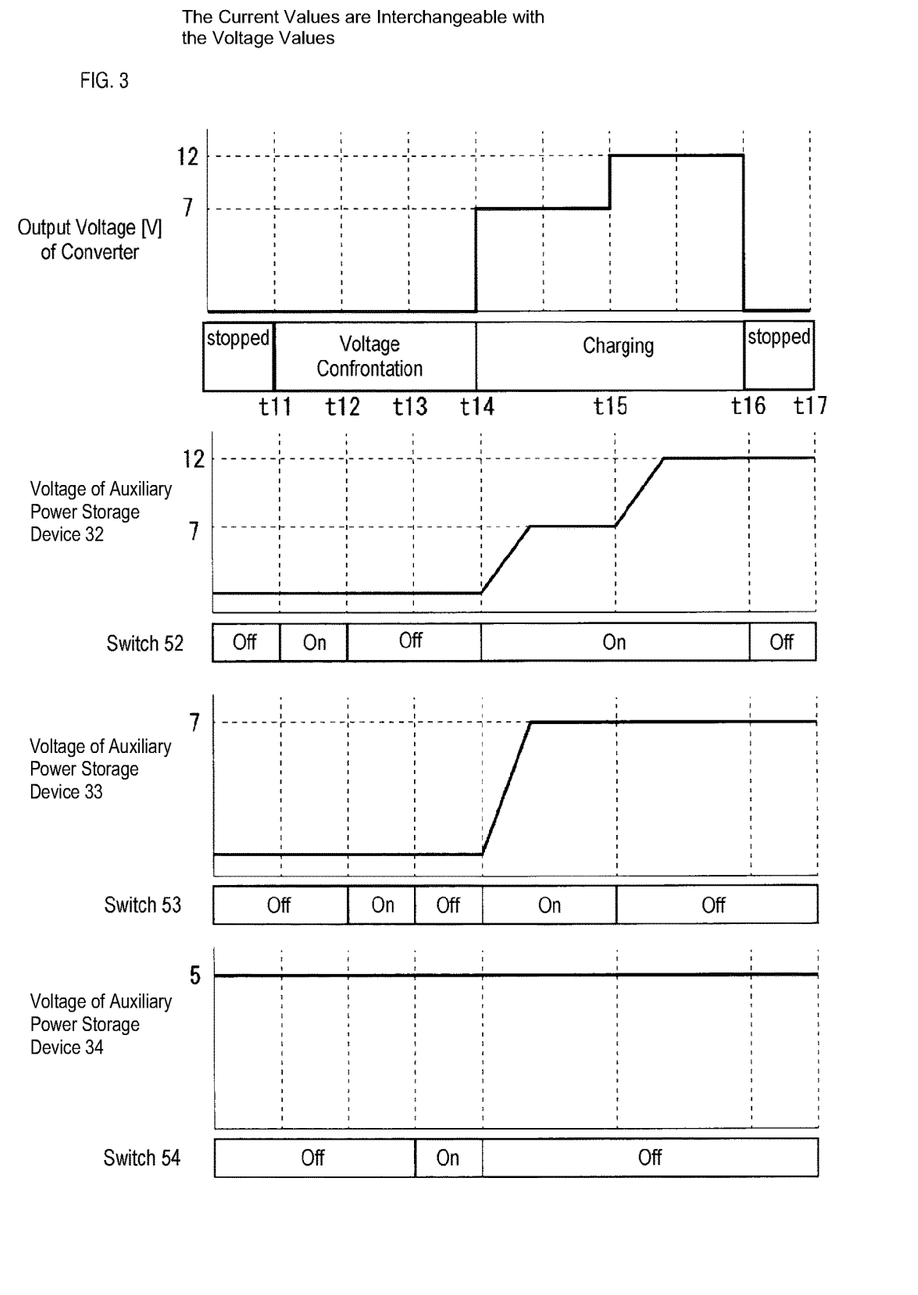
FIG. 3 is a diagram illustrating an example of a charging operation.

FIG. 3 is a diagram for illustrating an example of the charging operation. Initially, the converter 4 is not operating and the switches 52 to 54 are off. At time t11, the controller 41 turns on the switch 52. The DC voltage V on the output side of the converter 4 thereby matches the charging voltage of the auxiliary power storage device 32. The voltage monitoring circuit 42 judges whether charging of the auxiliary power storage device 32 needs to be started, based on the DC voltage V, and notifies the judgment result to the controller 41. Here, it is judged that the auxiliary power storage device 32 needs to be charged, for example.

At time t12 after receiving this notification, the controller 41 turns off the switch 52, and turns on the switch 53. The DC voltage V on the output side of the converter 4 thereby matches the charging voltage of the auxiliary power storage device 33. The voltage monitoring circuit 42 judges whether charging of the auxiliary power storage device 33 needs to be started, based on the DC voltage V, and notifies the judgment result to the controller 41. Here, it is judged that charging of the auxiliary power storage device 33 is also necessary, for example.

At time t13 after receiving this notification, the switch 53 is turned off and the switch 54 is turned on. The DC voltage V on the output side of the converter 4 thereby matches the charging voltage of the auxiliary power storage device 34.

The voltage monitoring circuit 42 judges whether charging of the auxiliary power storage device 34 needs to be started, based on the DC voltage V, and notifies the judgment result to the controller 41. Here, it is judged that charging of the auxiliary power storage device 34 is not necessary, for example.

It is thus first judged, prior to charging the plurality of auxiliary power storage devices 32 to 34, whether charging of the auxiliary power storage devices 32 to 34 needs to be started.

At t14 time after receiving this notification, the controller 41 turns on the switches that are connected to the auxiliary power storage devices that require charging, and maintains the other switches in an off state. Here, because it is judged that the auxiliary power storage devices 32 and 33 need to be charged and that the auxiliary power storage device 34 does not need to be charged, the switches 52 and 53 are turned on and the switch 54 is turned off at time t14, as shown in FIG. 3.

Also, the controller 41 causes the converter 4 to output the smallest among the voltages or currents suitable for the plurality of auxiliary power storage devices to be charged. For example, the controller 41 causes the converter 4 to output a voltage of the value (here, 7 V) suitable for the smaller of the rated voltages of the auxiliary power storage devices 32 and 33. The voltages of the auxiliary power storage devices 32 and 33 thereby appropriately increase over time.

When the voltages of the auxiliary power storage devices 32 and 33 then reach 7 V, the auxiliary power storage device 33 will be fully charged. At time t15 after the auxiliary power storage device 33 is fully charged, the controller 41 turns off the switch 53. That is, because charging of the auxiliary power storage device 33 is not necessary, the switch 53 is turned off. Note that even though, in the illustrative example of FIG. 3, the switch 53 is turned off at time t15 after a predetermined time period has elapsed from the point in time at which the voltage of the auxiliary power storage device 33 reached 7 V, the switch 53 may be turned off immediately after the point in time at which the voltage of the auxiliary power storage device 33 reaches 7 V, or in other words, immediately after the charging rate of the auxiliary power storage device 33 reaches the full charge reference value.

Also, the controller 41, at time t15, causes the converter 4 to output a larger voltage (here, 12 V) than the voltage (7 V) that was output by the converter 4 up until that point in time. The voltage of the auxiliary power storage device 32 thereby increases further over time. When the charging voltage of the auxiliary power storage device 32 then reaches 12 V, the auxiliary power storage device 32 will also be fully charged. At time t16 after the auxiliary power storage device 34 is fully charged, the controller 41 turns off the switch 52, and stops the operation of the converter 4. Note that even though, in the illustrative example of FIG. 3, the switch 52 is turned off after a predetermined time period has elapsed from the point in time at which the voltage of the auxiliary power storage device 32 reaches 12 V, the switch 52 may be turned off immediately after the point in time at which the voltage of the auxiliary power storage device 32 reaches 12 V, or in other words, immediately after the point in time at which the charging rate of the auxiliary power storage device 32 reaches the full charge reference value.

As mentioned above, when it is judged that both the auxiliary power storage device 32 and the auxiliary power storage device 33 need to be charged, the converter 4 first outputs a small first DC voltage, and after the switch 53 has turned off, the converter 4 outputs a second DC voltage that is larger than the first DC voltage. Of course, similarly to the charging operation 1, it is desirable to set the first DC voltage and the second DC voltage appropriately in order to avoid overvoltage charging. For example, the first DC voltage and the second DC voltage are respectively set to the rated voltage of the auxiliary power storage device 33 and the rated voltage of the auxiliary power storage device 32.

Note that even though the output voltage of the converter 4 is controlled in the abovementioned example, the output current may be controlled. For example, the case where the rated current of the auxiliary power storage device 33 is lower than the rated current of the auxiliary power storage device 32 will be considered. When it is judged that charging of both of auxiliary power storage devices 32 and 33 needs to be started, the controller 41 causes the converter 4 to output the first DC current, in a state where the switches 52 and 53 are turned on among the switches 52 to 54. The auxiliary power storage devices 32 and 33 are thereby charged. Thereafter, the controller 41 causes the converter 4 to output the second DC current which is larger than the first DC current, in a state where the switch 53 is turned off. The auxiliary power storage device 32 can thereby be charged with a current suitable for the auxiliary power storage device 32, after having stopped charging of the auxiliary power storage device 33. For example, the current that the converter 4 outputs to the auxiliary power storage devices 32 and 33 may be one tenth of the respective rated currents of the auxiliary power storage devices 32 and 33.

According to the abovementioned charging operation, as long as the charging voltage of the auxiliary power storage device 32 is lower than the charging voltage of the auxiliary power storage device 33 when fully charged, the auxiliary power storage device 32 can be charged in parallel during the period in which the auxiliary power storage device 33 is charged, and is quickly charged. On the other hand, according to the charging operation of FIG. 2, charging of the auxiliary power storage device 33, for example, is not started until charging of the auxiliary power storage device 32 is completed. Therefore, the auxiliary power storage device 33 could possibly be unable to supply sufficient power to the relief load 23 during that period. On the other hand, according to the charging operation of FIG. 3, the auxiliary power storage devices 32 and 33 are charged in parallel, and thus sufficient power can be rapidly supplied to the relief load 23.

Note that even though the voltage confirmation period is shown as being comparatively long in the illustrative example of FIGS. 2 and 3, it is in fact sufficiently short compared with the charging period. Even though, according to the charging method of FIG. 3, the charging start timing of the auxiliary power storage device 32 is late compared with FIG. 2, the voltage confirmation period is sufficiently short compared with the charging period, and the delay is in fact small.

Note that even though, in the abovementioned example in the charging operation 2, the converter 4 outputs a voltage suitable for the auxiliary power storage device 32, after having turned off the switch 53 once charging of the auxiliary power storage device 33 is completed, the present invention is not necessarily limited thereto. The converter 4 may output a voltage suitable for the auxiliary power storage device 32, after having turned off the switch 53 while the auxiliary power storage device 33 is being charged. Even in this case, the charging rate of the auxiliary power storage device 33 can be increased to a certain degree early on.

The configurations described in the above embodiments and modifications can be combined as appropriate, as long as there are no mutual inconsistencies.

Although the invention has been described above in detail, the abovementioned description is, in all respects, illustrative, and the invention is not limited thereto. It should be understood that numerous modifications that are not illustrated can be conceived without departing from the scope of the invention.

The invention claimed is:

1. An in-vehicle power supply apparatus comprising:
a DC-DC converter that outputs DC power;
a first power storage device having a first voltage threshold and a second power storage device having a second voltage threshold, the first power storage device and the second power storage device are charged via the DC-DC converter, the first voltage threshold being greater than the second voltage threshold;
a first switch that selects on/off between the DC-DC converter and the first power storage device;
a second switch that selects on/off between the DC-DC converter and the second power storage device; and
a voltage monitoring circuit that detects a voltage on the output side of the DC-DC converter, at a point closer to the DC-DC converter than are the first switch and the second switch,
wherein the voltage monitoring circuit
judges whether charging the first power storage device needs to be started, based on the voltage when the first switch is on, the second switch is off, and the DC-DC converter has stopped operating, and
judges whether charging the second power storage device needs to be started, based on the voltage detected by the voltage monitoring circuit when the first switch is off, the second switch is on, and the DC-DC converter has stopped operating; and
wherein the first switch and the second switch are turned on and the DC-DC converter is configured to charge the first power storage device and the second power storage device, the DC-DC converter outputting a voltage having the same value as the second threshold, wherein the second switch is turned off when the second power storage device reaches the second voltage threshold and the controller actuates the DC-DC converter to output a voltage having the same value as the first threshold, and wherein the first power storage device is charged until the voltage matches the first voltage threshold, wherein the first switch is turned off.

2. The in-vehicle power supply apparatus according to claim 1,
wherein a rated voltage of the first power storage device is greater than a rated voltage of the second power storage device,
when it is judged that charging of the first power storage device needs to be started, the DC-DC converter outputs the DC power at a first DC voltage, in a state where the first switch and the second switch are respectively turned on and off, and
when it is judged that charging of the second power storage device needs to be started, the DC-DC converter outputs the DC power at a second DC voltage that is smaller than the first DC voltage, in a state where the first switch and the second switch are respectively turned off and on.

3. The in-vehicle power supply apparatus according to claim 1,
wherein a rated current of the first power storage device is greater than a rated current of the second power storage device,
when it is judged that charging of the first power storage device needs to be started, the DC-DC converter outputs the DC power at a first DC current, in a state where the first switch and the second switch are respectively turned on and off, and
when it is judged that charging of the second power storage device needs to be started, the DC-DC converter outputs the DC power at a second DC current that is smaller than the first DC current, in a state where the first switch and the second switch are respectively turned off and on.

4. The in-vehicle power supply apparatus according to claim 1,
wherein a rated voltage of the first power storage device is greater than a rated voltage of the second power storage device, and
when it is judged that charging of both the first power storage device and the second power storage device needs to be started, the DC-DC converter outputs the DC power at a first DC voltage, after the first switch and the second switch have turned on, and, thereafter, the DC-DC converter outputs the DC power at a second DC voltage that is larger than the first DC voltage, after the second switch has turned off.

5. The in-vehicle power supply apparatus according to claim 1,
wherein a rated current of the first power storage device is greater than a rated current of the second power storage device, and
when it is judged that charging of both the first power storage device and the second power storage device needs to be started, the DC-DC converter outputs the DC power at a first DC current, after the first switch and the second switch have turned on, and, thereafter, the DC-DC converter outputs the DC power at a second DC current that is larger than the first DC current, after the second switch has turned off.

6. An in-vehicle power supply apparatus comprising:
a DC-DC converter that outputs DC power;
a first power storage device having a first voltage threshold and a second power storage device having a second voltage threshold, the first power storage device and the second power storage device are charged via the DC-DC converter, the first voltage threshold being greater than the second voltage threshold;
a first switch that selects on/off between the DC-DC converter and the first power storage device;
a second switch that selects on/off between the DC-DC converter and the second power storage device;
a controller configured to actuate the first and second switches and the DC-DC converter; and
a voltage monitoring circuit that detects a voltage on an output side of the DC-DC converter, at a point closer to the DC-DC converter than are the first switch and the second switch so as to actuate the first and second switches based upon the voltage detected by the voltage monitoring circuit;
wherein controller turns off the DC-DC converter and actuates the voltage monitoring circuit, wherein the voltage monitoring circuit monitors the first power storage device by turning off the second switch and turning on the first switch and wherein the controller is configured to turn on the first switch and the second switch and actuate the DC-DC converter if the voltage measured by the voltage monitoring circuit is below the first voltage threshold so as to charge both the first power storage device and the second power storage device at an output voltage having the same value as the second threshold and charge the second power storage device until the voltage of the second power storage device reaches the second voltage threshold and is fully charged, wherein the controller turns off the second switch, and wherein the the DC-DC converter outputs an output voltage having the same value as the first threshold, wherein the controller turns off the DC-DC converter and the first switch when the first power storage device reaches the first voltage threshold and the first power storage device is fully charged.

* * * * *